July 17, 1962  L. E. MATTHEWS  3,044,292
VIBRATION TABLE

Original Filed Dec. 17, 1958  2 Sheets-Sheet 1

INVENTOR.
LYLE E. MATTHEWS
ATTORNEYS

July 17, 1962 L. E. MATTHEWS 3,044,292
VIBRATION TABLE

Original Filed Dec. 17, 1958 2 Sheets-Sheet 2

*INVENTOR.*
LYLE E. MATTHEWS
BY
*ATTORNEYS*

United States Patent Office 3,044,292
Patented July 17, 1962

3,044,292
VIBRATION TABLE
Lyle E. Matthews, Oxnard, Calif., assignor to the United States of America as represented by the Secretary of the Navy
Original application Dec. 17, 1958, Ser. No. 781,172. Divided and this application July 23, 1959, Ser. No. 829,165
1 Claim. (Cl. 73—71.6)

The invention described herein may be manufactured and used by or for the Government of the United States of America for governmental purposes without the payment of any royalties thereon or therefor.

The present invention relates to apparatus by means of which a particular vibratory environment may be simulated in order to determine the performance of one or more components designed to operate in such an environment for an extended period of time. The invention further relates to a driving mechanism, especially but not exclusively intended for use with such a vibration simulator, which acts to convert rotary motion into reciprocating or oscillatory movement. This application constitutes a division of application Serial No. 781,172 filed December 17, 1958.

It is frequently desirable to ascertain in advance the reliability of a component or assembly which will be subjected in actual use to severe and/or prolonged shocks or vibrations. To accomplish this with any degree of accuracy, the apparatus employed for testing purposes must be able to simulate quite closely the actual conditions to be encountered by the structure under investigation.

When the latter is of relatively small size and weight, the problem is not too difficult of solution. However, especially as the weight factor increases, conventional testing machines yield results which are progressively less satisfactory. For example, practically all equipment designed for shipboard use must withstand substantially continuous vibration (caused primarily by the ship's propellers) while the vessel is under way. Such vibration is usually of a fairly constant frequency between 15 and 20 cycles per second, with an amplitude up to one $q$ depending upon the cruising speed of the ship and the location thereon. Ordinarily, this is not too serious a matter, as most marine installations are of a rather massive nature. However, at the present time various types of guided missiles are being mounted on aircraft carriers or other vessels specifically designed to accommodate such weapons, and, of course, the missiles, as well as their associated check-out equipment, must be ready for instant use. These missiles, especially in their guidance systems, incorporate a large number of extremely minute parts which are delicately balanced and critically positioned. Although of course these components are designed to be as rugged as possible, space limitations necessitate certain compromises in this respect, and, in order to determine just what the limit is to which a missile can be continuously vibrated before operational failure ensues, preinstallation laboratory tests are a practical necessity.

In the example above given, a single missile and its associated check-out apparatus may weigh in the neighborhood of 4,000 pounds and extend over a base area of as much as 100 square feet. A platform of suitable size and strength to support such a load may weigh 2,000 pounds. Since a satisfactory laboratory vibrator should be capable of producing an acceleration of at least 2 $g$'s, the required vibratory force for the missile assembly plus its platform is at least 12,000 pounds, or 6 tons. In addition, some 2,000 pounds of this load may be on shock mounts, so that, at resonance, its acceleration is amplified by a factor of three. This requires an additional two tons of force to vibrate the platform. Thus, the testing device must be capable of developing from eight to ten tons of vibratory force. The situation is made even more complex by the fact that the load is spread over a large surface area (the platform may be 10' x 10', for example) and, in addition, the center of gravity of the load is frequently offset from the center of the platform. Still further, a lateral stability problem may arise if the load's center of gravity is more than a few inches above the platform surface.

For optimum results, the vibrator should produce simple harmonic motion in the vertical direction with minimum angular movement about any axis. It should also operate equally well under all load conditions within its rated capabilities. Finally, it should possess a minimum number of adjustments for frequency, amplitude and balance, with such adjustments being readily accessible to the operator thereof.

A vibrator which satisfies the above requirements is provided by the present invention. In a preferred embodiment, it consists of a flat table or platform which is horizontally supported in spaced relation to a rigid foundation through a plurality of toggle joints. Each toggle joint has two arms, one of which is pivotally secured at one of its ends to the table, and the other of which is pivotally secured at one of its ends to the foundation. The remaining ends of the arms are rotatably attached to one another and to a connecting rod which extends horizontally in the space between the foundation and the lower surface of the platform. An oscillatory movement of this connecting rod results in a vertical displacement of the platform, first downwardly and then upwardly. Three or four toggle joints are usually associated with each connecting rod, and a number of such connecting rod assemblies arranged in parallel fashion so as to provide adequate support for all sections of the platform.

One object of the present invention, therefore, is to provide test apparatus for the laboratory simulation of a particular vibratory environment.

Another object of the invention is to provide a so-called "vibration table" adapted to produce vertical vibratory motion from a driving force applied in a direction generally transverse thereto.

Other objects and many of the attendant advantages of this invention will be readily appreciated as the same becomes better understood by reference to the following detailed description when considered in connection with the accompanying drawings wherein.

Figure 1:
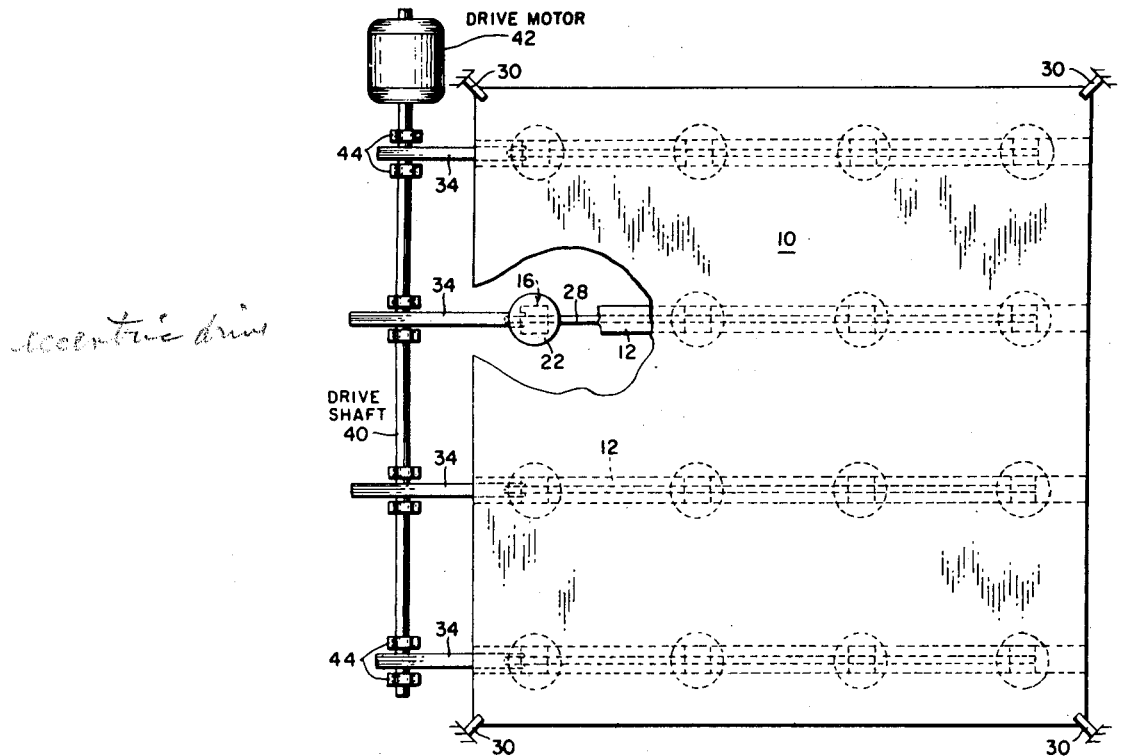
FIG. 1 is a plan view of a vibration simulator designed in accordance with a preferred embodiment of the present invention.

A number of techniques are presently known by means of which a load may be vibrated. One of these employs the principle of resonance, and is embodied, for example, in a platform mounted on springs and driven by an oscillatory force. When the stiffness of the springs is such that the natural frequency of the spring-load system is the same as that of the driving frequency (or in other words, when the system is at reasonance) then the springs produce most of the vibratory force and very little external power is required. A disadvantage is that large forces are applied to the support on which the springs are mounted. Another method utilizes the reaction thus generated by the rotation of unbalanced weights. This has the advantage over the resonant shaker of imparting greatly decreased forces to the base or support on which the shaker is mounted.

Each of the above systems, however, has certain drawbacks. These include (1) a relatively high degree of instability, especially when the weight distribution is nonuniform, (2) the mode of vibration varies when the load is at resonance, and (3) actual vibratory displacement is a function of load, load distribution, and frequency.

To overcome the drawbacks of structures such as the above, the present invention provides for the development of linear vibratory motion from oscillatory motion occurring in a plane normal to the vibrations. This is accomplished in the embodiment illustrated by means which includes the table or platform 10 of FIGS. 1 and 2. This table 10 may be fabricated of some material such as one-inch thick aluminum alloy, and is of a size (10′ x 10′ is typical) dependent upon the particular dimensions of the package to be tested. Although not shown, a plurality of openings are formed in the table to accommodate a corresponding number of hold-down bolts, the location of such openings being again governed by the physical characteristics of the object or assembly under investigation. Attached to the lower surface of table 10 to lend structural rigidity thereto are a plurality of I-beams 12 also preferably formed of aluminum alloy and arranged in spaced-apart parallel fashion as shown in the drawings.

The table assembly 10–12 is designed to be supported upon a solid base 14 (such as a concrete foundation) in such fashion that it may undergo limited vertical displacement with respect thereto. For this purpose, there is provided a plurality of double toggle joints each of which is generally identified in the drawings by the reference numeral 16. Although the number of such toggle joint assemblies is obviously determined by the surface dimensions of table 10, the drawing illustrates four rows of toggles parallel to and aligned with the I-beams 12, with four toggles in each row. To eliminate or substantially reduce unloaded "beam" resonance in the first and second natural modes, each toggle joint assembly is located near the natural mode nodal lines of the platform. The natural frequency of the third mode is beyond the operating limits of the illustrated device.

Figure 2:
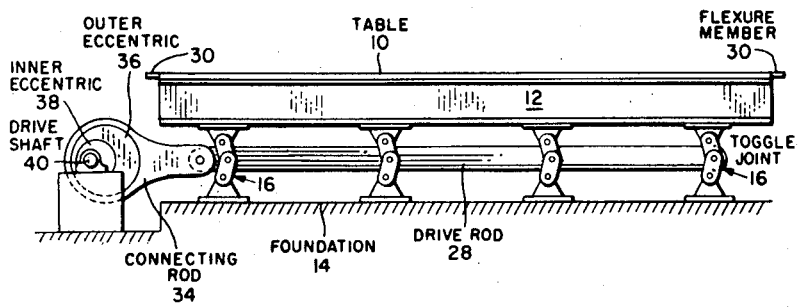
FIG. 2 is an end view of the vibration simulator of FIG. 1 showing certain of the toggle joint assemblies.
Figure 2A:
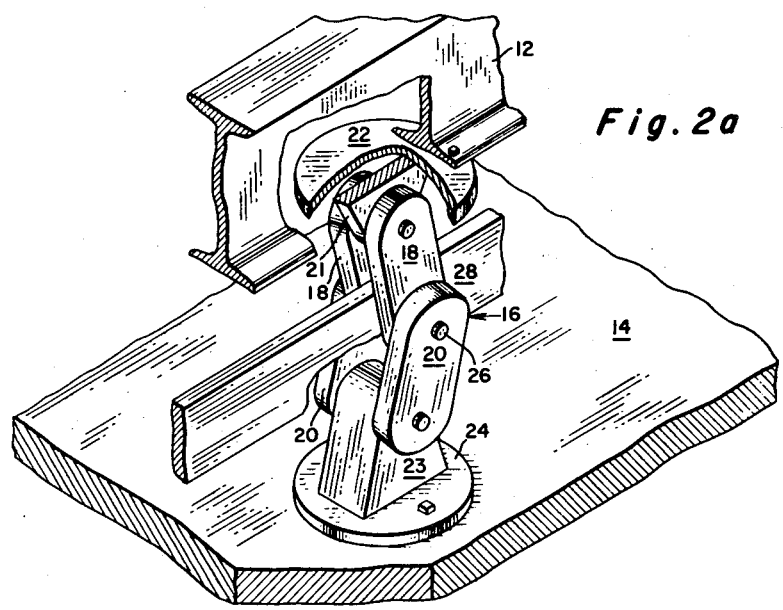
FIG. 2a is an enlraged view of one of the toggle joint assemblies of FIG. 2.

A representative toggle joint assembly is shown in FIG. 2a. It consists of a pair of double toggle arms 18 and 20, the arm 18 being pivotally attached at its upper end to the support block 21. The latter is secured to the under surface of the I-beams 12 through the disc-shaped adaptor 22, while the arm 20 is pivotally secured at its lower end to the base or foundation 14 by means of the pillow block 23 and the adaptor 24. The remaining extremities of the toggle arms 18 and 20 are pivotally connected by the pin 26 to form a "knee" joint, as illustrated.

Referring again to FIG. 2, the "knee" joints of the toggles making up a single row are actuated by a common transverse drive rod 28, which, for example, may be a horizontally-positioned bar of aluminum alloy having openings designed to receive the pins 26.

It should now be apparent that movement of the drive rod 28 essentially in a horizontal plane (alternately) from left to right in FIG. 2) will result in a vertical displacement of the table 10. This displacement should contain no appreciable horizontal component, and, consequently, four flexure members 30 are respectively attached to the corners of the table 10 (as shown in FIGS. 1 and 2 only) to reduce any horizontal motion of the table to a minimum. It is desirable to reverse the direction of motion of the toggle knee joints in alternate rows to effectively cancel any horizontal thrust forces which might otherwise be developed during operation.

Each transverse drive rod 28 has essentially simple harmonic motion imparted thereto by means of a connecting rod 34 (FIGS. 1 and 2) one end of which is pivotally connected to the drive rod 28 and the other end of which is mounted through ball bearings on an eccentric 36, the latter in turn being rotatably carried on a second eccentric 38. The inner eccentric 38 is mounted on a drive shaft 40 for rotation therewith. The outer eccentric 36 is adjustable in position with respect to the inner eccentric 38, and, as a result of such an adjustment, the lateral movement imparted to the member 28 (or, in other words, the "throw" of the connecting rod 34) may be controllably varied from zero to maximum to correspondingly vary the vertical displacement of the platform or table 10. In FIG. 2 the two eccentrics 36—38 are set for a maximum "throw" of the connecting rod 34.

As above mentioned, reversal of the direction of motion of the toggle knee joints in alternate rows is desirable in order to effectively cancel any horizontal thrust forces which might otherwise be developed during operation of the apparatus. This is accomplished by angularly off-setting the eccentric assemblies in alternate rows by 180°.

For example, the mounting of the inner eccentric 38 of FIG. 2 on drive shaft 40 is angularly identical in rows 1 and 4 of FIG. 1 (reading down from the top) and is off-set from this position by 180° in rows 2 and 3. Thus, there is a difference in the direction of movement of the drive rods 28 in alternate rows 1 and 3 as well as in alternate rows 2 and 4.

It will be noted that the essentially simple harmonic motion imparted to the drive rod 28 produces a sinusoidal movement of the platform 10 at twice the oscillatory frequency of the drive rod. This "frequency-doubling" factor enables the drive shaft 40 to operate at a relatively low speed of rotation. For example, a drive shaft speed of 600 r.p.m. develops a vibratory platform movement at the rate of 20 c.p.s.

The shaft 40 is driven by a variable speed motor 42 (FIG. 1). It is supported by a plurality of roller bearing pillow blocks 44 one of which is placed on each side of each connecting rod assembly.

It might be expected that an off-center relationship of the two eccentrics 36—38 as described above might result in a dynamic unbalance of the crankshaft mechanism. Any such tendency, however, is readily overcome by adding weights thereto. Specifically, the center of gravity of the outer eccentric (plus its bearing) and that part of the connecting rod assembly directly associated therewith is adjusted to the center of the inner eccentric. Then weights are added to the inner eccentric until the combined center of gravity of all of the rotating parts is adjusted to the axis of the drive shaft. Such a technique provides dynamic balance of assembly regardless of the particular eccentricity setting selected.

Obviously many modifications and variations of the present invention are possible in the light of the above teachings. It is therefore to be understood that within the scope of the appended claim the invention may be practiced otherwise than as specifically described.

I claim:

Apparatus for simulating a particular vibratory environment to determine the response of an object thereto, said apparatus comprising a horizontally-positioned table adapted to have said object securely mounted thereon, a stationary base member, means for supporting said table in spaced relationship to said base member so as to permit a cyclic vertical displacement therebetween, a driving mechanism connected to said supporting means, means for imparting a horizontal oscillatory movement to said driving mechanism to bring about the cyclic vertical displacement of said table with respect to said base member, said means for supporting said table in spaced relationship to said base member including a plurality of toggle joints, one end of each toggle joint being pivotally connected to said table, the other end of each toggle joint being pivotally connected to said base member, and the knee of each toggle joint being pivotally connected to said driving mechanism, said plurality of toggle joints being arranged in parallel rows, said driving mechanism including a plurality of horizontally-positioned drive rods equal in number to the number of rows of toggle joints, one drive rod being pivotally connected to the knees of each of the toggle joints making up one of said rows, said means for imparting a horizontal oscillatory movement to said driving mechanism to bring about the cyclic vertical displacement of said table with respect to said base member including means for reversing the direction of motion of the toggle joints in alternate rows to reduce horizontal forces imparted to said table from said driving mechanism as a result of the horizontal oscillatory movement of said drive rods.

References Cited in the file of this patent

UNITED STATES PATENTS

| | | |
|---|---|---|
| 1,947,398 | Stuhler | Feb. 13, 1934 |
| 2,348,189 | Buchanan et al. | May 9, 1944 |
| 2,831,353 | Ongaro | Apr. 22, 1958 |

FOREIGN PATENTS

| | | |
|---|---|---|
| 788,318 | France | July 29, 1935 |
| 891,678 | France | Dec. 17, 1943 |
| 787,515 | Great Britain | Dec. 11, 1957 |